United States Patent
Strozier et al.

(10) Patent No.: US 10,912,323 B2
(45) Date of Patent: Feb. 9, 2021

(54) NUTRITIONAL SUPPLEMENT POWDER

(71) Applicant: ABBOTT LABORATORIES, Abbott Park, IL (US)

(72) Inventors: Deborah Strozier, Westerville, OH (US); Ronald McKenna, Lewis Center, OH (US); Tama Bloch, Columbus, OH (US); Kuochu Li, Hilliard, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 65 days.

(21) Appl. No.: 16/080,574

(22) PCT Filed: Feb. 28, 2017

(86) PCT No.: PCT/US2017/019819
§ 371 (c)(1),
(2) Date: Aug. 28, 2018

(87) PCT Pub. No.: WO2017/151540
PCT Pub. Date: Sep. 8, 2017

(65) Prior Publication Data
US 2019/0328021 A1  Oct. 31, 2019

Related U.S. Application Data (60) Provisional application No. 62/301,300, filed on Feb. 29, 2016.

(51) Int. Cl.
| | |
|---|---|
| A23L 29/294 | (2016.01) |
| A23L 33/19 | (2016.01) |
| A23L 33/16 | (2016.01) |
| A23L 33/15 | (2016.01) |
| A23L 33/21 | (2016.01) |

(52) U.S. Cl.
CPC ............ *A23L 29/294* (2016.08); *A23L 33/15* (2016.08); *A23L 33/16* (2016.08); *A23L 33/19* (2016.08); *A23L 33/21* (2016.08)

(58) Field of Classification Search
CPC .............. A61K 31/702; A23V 2002/00; A23V 2250/28; A23L 33/40; A23L 33/21; A23L 2/52; A23L 33/16; A23L 33/30; A23L 33/15; A23L 29/294

See application file for complete search history.

(56) References Cited

U.S. PATENT DOCUMENTS

| | | |
|---|---|---|
| 3,814,820 A | 6/1974 | Busta et al. |
| 4,710,387 A | 12/1987 | Uiterwaal et al. |
| 4,737,364 A | 4/1988 | Kalogris |
| 6,592,863 B2 | 7/2003 | Fuchs et al. |
| 6,630,178 B1 | 10/2003 | Hoie |
| 6,887,850 B2 | 5/2005 | Fuchs et al. |
| 7,758,893 B2 | 7/2010 | Hageman et al. |
| 8,137,718 B2 | 3/2012 | Russell et al. |
| 8,293,264 B2 | 10/2012 | Rosales et al. |
| 8,518,469 B2 | 8/2013 | MacDonald et al. |
| 9,968,123 B2 | 5/2018 | Gupta et al. |
| 2002/0064578 A1 | 5/2002 | Henry et al. |
| 2006/0083824 A1 | 4/2006 | Manning et al. |
| 2008/0003265 A1 | 1/2008 | Casey et al. |
| 2008/0171720 A1 | 7/2008 | Garssen et al. |
| 2008/0305212 A1 | 12/2008 | Wong et al. |
| 2008/0311265 A1 | 12/2008 | MacDonald et al. |
| 2009/0082249 A1 | 3/2009 | Garssen et al. |
| 2011/0097442 A1 | 4/2011 | Harju et al. |
| 2011/0129573 A1 | 6/2011 | Albrecht et al. |
| 2012/0100248 A1* | 4/2012 | Das ...................... A61K 31/716 426/2 |
| 2012/0121562 A1 | 5/2012 | Bergonzelli Degonda et al. |
| 2013/0052278 A1 | 2/2013 | Hallie et al. |
| 2015/0208706 A1 | 7/2015 | Patel et al. |
| 2016/0037815 A1 | 2/2016 | Walton et al. |
| 2017/0172196 A1 | 6/2017 | Gupta et al. |

FOREIGN PATENT DOCUMENTS

| | | |
|---|---|---|
| CN | 101317684 A | 12/2008 |
| CN | 101744054 A | 6/2010 |
| CN | 103125602 A | 6/2013 |
| CN | 103478547 A | 1/2014 |
| WO | 9731546 A1 | 9/1997 |
| WO | 2004075653 A1 | 9/2004 |
| WO | 2005013721 A1 | 2/2005 |
| WO | 2007039596 A1 | 4/2007 |
| WO | 2007070611 A2 | 6/2007 |
| WO | 2012143402 A1 | 10/2012 |

(Continued)

OTHER PUBLICATIONS

International Search Report and Written Opinion for PCT/US2017/019819 dated May 3, 2017.
International Preliminary Report on Patentability for PCT/US2017/019819 dated Sep. 4, 2018.
Barber et al., "Fish Oil—Enriched Nutritional Supplement Attenuates Progression of the Acute-Phase Response in Weight-Losing Patients with Advanced Pancreatic Cancer," J. Nutr. (1999), vol. 129, pp. 1120-1125.

(Continued)

*Primary Examiner* — Hong T Yoo
(74) *Attorney, Agent, or Firm* — Calfee, Halter & Griswold LLP (57) ABSTRACT

A nutritional supplement powder and a method of making the nutritional supplement powder are provided. The nutritional supplement powder includes from 20% by weight to 55% by weight protein, from 20% by weight to 50% by weight fructooligosaccharide powder, and an anti-caking mixture that includes calcium silicate and tricalcium phosphate. A weight ratio of the fructooligosaccharide powder to the anti-caking mixture is from 6:1 to 10:1.

19 Claims, 2 Drawing Sheets

(56) References Cited

FOREIGN PATENT DOCUMENTS

WO     2015148384 A1    10/2015
WO     2016007017 A1    5/2016

OTHER PUBLICATIONS

Mintel: Topfer Lactana—"Stage 3 Organic Follow-Up Formula," www.gnpd.com; published Nov. 1, 2013, XP002752486.

* cited by examiner

NUTRITIONAL SUPPLEMENT POWDER

CROSS-REFERENCE TO RELATED APPLICATIONS

This application is the U.S. national stage entry of International Application No. PCT/US20176/019819, filed Feb. 28, 2017, which claims priority to and any other benefit of U.S. Provisional Patent Application No. 62/301,300, filed Feb. 29, 2016, the entire contents of which are incorporated by reference herein.

FIELD

The present disclosure relates to nutritional supplement powders and methods of making nutritional supplement powders. More particularly, the present disclosure relates to nutritional supplement powders for supplementing the nutritional value of food, and methods of making nutritional supplement powders so that the nutritional supplement powders exhibit minimal caking, if any.

BACKGROUND

Proper nutrition is generally regarded as one of the key factors for achieving and maintaining good health. This is particularly true for infants and children as they grow and develop. However, children can be picky eaters, often preferring foods and beverages that are rich in simple sugars and starch. Typically, these children-preferred foods and beverages are lower in, or completely lack, the essential nutrients needed to support optimal growth and development of children.

SUMMARY

Disclosed herein are nutritional supplement powders and methods of making nutritional supplement powders. To illustrate various aspects of the present disclosure, several exemplary embodiments of nutritional supplement powders and methods of making the nutritional supplement powders are provided herein.

In one exemplary embodiment, a nutritional supplement powder is provided. The nutritional supplement powder includes from 20% by weight to 55% by weight protein, from 20% by weight to 50% by weight fructooligosaccharide powder, and an anti-caking mixture that includes calcium silicate and tricalcium phosphate. A weight ratio of the fructooligosaccharide powder to the anti-caking mixture is from 6:1 to 10:1.

In certain exemplary embodiments, the anti-caking mixture includes from 65% by weight to 80% by weight tricalcium phosphate and from 20% by weight to 35% by weight calcium silicate. In certain exemplary embodiments, the calcium silicate has an average particle size of 4 μm to 5 μm, the tricalcium phosphate has an average particle size of 2.5 μm to 3.25 μm, and the fructooligosaccharide powder has an average particle size of 80 μm to 100 μm.

In certain exemplary embodiments, the nutritional supplement powder includes from 30% by weight to 40% by weight protein, from 30% by weight to 40% by weight fructooligosaccharide powder, and the weight ratio of the fructooligosaccharide powder to the anti-caking mixture is from 8:1 to 9:1.

In one exemplary embodiment, a method of making a nutritional supplement powder is provided. The method includes mixing together fructooligosaccharide powder and an anti-caking mixture to form a powder pre-blend. The anti-caking mixture includes calcium silicate and tricalcium phosphate. A weight ratio of the fructooligosaccharide powder to the anti-caking mixture is from 6:1 to 10:1. The method also includes adding protein, docosahexaenoic acid, lutein, vitamins, and minerals to the powder pre-blend and mixing together to form the nutritional supplement powder.

In certain exemplary embodiments of the method, the fructooligosaccharide powder and the anti-caking mixture are mixed together for 2 minutes to 10 minutes. In certain exemplary embodiments of the method, the protein, docosahexaenoic acid, lutein, vitamins, minerals, and the powder pre-blend are mixed together for 4 minutes to 20 minutes. In certain exemplary embodiments of the method, the nutritional supplement powder is packaged into stick packs.

DETAILED DESCRIPTION

Disclosed herein are nutritional supplement powders and methods of making nutritional supplement powders. While the present disclosure describes certain embodiments of the nutritional supplement powder and methods in detail, the present disclosure is to be considered exemplary and is not intended to be limited to the disclosed embodiments.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use.

The nutritional supplement powders and corresponding methods of making the nutritional supplement powders of the present disclosure can comprise, consist of, or consist essentially of the essential elements of the disclosure as described herein, as well as any additional or optional element described herein or which is otherwise useful in nutritional supplement applications.

All percentages, parts, and ratios as used herein are by weight of the total formulation, unless otherwise specified. All such weights as they pertain to listed ingredients are based on the active level and, therefore, do not include solvents, by-products, or other components that may be included in commercially available materials, unless otherwise specified.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

The phrase "nutritional supplement powder" as used herein, refers to a powdered product that is intended to provide supplemental nutrition and thus is not a sole source of nutrition.

The phrase "essentially free" as used herein, unless otherwise specified, means that the nutritional supplement powder may include a trace amount, typically less than about 0.1 wt %, of a particular component. Such trace amounts of the component typically result from the component being inherently present in a required ingredient. In addition, the term "essentially free" should be understood to mean that the nutritional supplement powder is not manufactured using a particular component. For example, a nutritional supplement powder that is essentially free of divalent ions of copper, iron, and zinc would not be manufactured using any of, for example, cupric sulfate, ferrous sulfate, and zinc sulfate.

The term "organoleptic" as used herein, unless otherwise specified, refers to a sensory property of a food such as taste, color, odor, and mouthfeel.

Nutritional supplement powders according to the present disclosure comprise from 20% by weight to 55% by weight protein, from 20% by weight to 50% by weight fructooligosaccharide powder, and an anti-caking mixture comprising calcium silicate and tricalcium phosphate. A weight ratio of the fructooligosaccharide powder to the anti-caking mixture in the nutritional supplement powders is from 6:1 to 10:1. The nutritional supplement powders exhibit minimal caking, if any, and are formulated to be bland or flavorless as well as substantially colorless. When the nutritional supplement powder is added to food, the nutritional supplement powder does not substantially change the organoleptic properties of the food.

Embodiments of the nutritional supplement powder described herein comprise from 20% by weight to 55% by weight protein. In certain embodiments, the nutritional supplement powder comprises from 20% by weight to 50% by weight protein, including from 25% by weight to 45% by weight protein, and also including from 30% by weight to 40% by weight protein. It should be understood that the weight percentage of protein described herein refers to the amount of protein present in the nutritional supplement powder as opposed to the amount of a protein source present in the nutritional supplement powder, where the protein source may contain other non-protein components. For example, certain protein sources may be 30% by weight protein, 50% by weight protein, 80% by weight protein, or 90% by weight protein, while the remainder of the protein source comprises carbohydrates, fats, minerals, water, and so forth.

Suitable types of protein for use in the exemplary nutritional supplement powder described herein include, but are not limited to, whey protein, casein protein, vegetable proteins (e.g., soy protein, pea protein), and combinations thereof. Whey protein and casein protein, and sources thereof, are preferred because they have a more neutral and cleaner flavor. Vegetable proteins such as soy protein and pea protein may be used, but are less preferred because these proteins can create flavor off notes.

In certain embodiments, the protein of the nutritional supplement powder comprises whey protein. The whey protein may be provided by a wide variety of sources of whey protein. Exemplary sources of whey protein include, but are not limited to, whey protein concentrate, whey protein isolate, milk protein concentrate, milk protein concentrate, and combinations thereof.

In certain embodiments, the protein of the nutritional supplement powder comprises whey protein provided by a whey protein concentrate. The whey protein concentrate provides a bland flavor and good dispersibility when added into a variety of foods. In certain embodiments, the whey protein concentrate is an agglomerated whey protein concentrate. An agglomerated whey protein concentrate can improve the solubility and dispersibility of the nutritional supplement powder when added to food. The term "agglomerated" as used herein refers to a powder that is processed such that very small powder particles are fused together to form large agglomerates with limited points of contact between the particles so that most of the surface area of the agglomerate is available to wetting. The particle size of the agglomerates that comprise the agglomerated whey protein concentrate may vary widely, but is typically in the range of 100 μm to 1,500 μm. The agglomerated whey protein concentrates described herein may be produced according to well known processes, such as agglomeration or instantization by spray lecithination. For example, in instantization by spray lecithination, a lecithin, such as sunflower lecithin, having a suitable hydrophilic-lipophilic balance (HLB) and viscosity is sprayed uniformly onto the surface of the powder in a fluid bed or dry blender.

In certain embodiments, the protein of the nutritional supplement powder comprises whey protein provided by a whey protein concentrate and a milk protein concentrate, which comprises both whey protein and casein protein. As noted above, the whey protein concentrate provides a bland flavor and good dispersibility properties, and the milk protein concentrate can help balance out any whey notes to provide a more neutral, cleaner flavor. In certain embodiments, a weight ratio of the whey protein concentrate to the milk protein concentrate ranges from 50:50 to 90:10, including from 60:40 to 90:10, from 70:30 to 90:10, from 80:20 to 90:10, and also including about 90:10. In certain embodiments, the nutritional supplement powder comprises whey protein provided by a whey protein concentrate and a milk protein concentrate, and the weight ratio of the whey protein concentrate to the milk protein concentrate is about 90:10. In certain embodiments, the whey protein concentrate is an agglomerated whey protein concentrate and the milk protein concentrate is an agglomerated milk protein concentrate. Using an agglomerated whey protein concentrate, an agglomerated milk protein concentrate, or both can improve the solubility and dispersibility of the nutritional supplement powder when added to food.

In certain embodiments, the protein of the nutritional supplement powder comprises whey protein provided by a whey protein isolate. In certain embodiments, the whey protein isolate is an agglomerated whey protein isolate. In certain embodiments, the protein of the nutritional supplement powder comprises whey protein provided by a milk protein isolate. In certain embodiments, the milk protein isolate is an agglomerated milk protein isolate. In certain embodiments, the protein of the nutritional supplement powder comprises whey protein provided by at least one of a whey protein concentrate, a milk protein concentrate, a whey protein isolate, and a milk protein isolate. In certain embodiments, the protein of the nutritional supplement powder comprises whey protein provided by at least one of an agglomerated whey protein concentrate, an agglomerated milk protein concentrate, an agglomerated whey protein isolate, and an agglomerated milk protein isolate.

A wide variety of commercially available protein sources may be used to provide the protein of the exemplary nutritional supplement powder disclosed herein. An exemplary whey protein concentrate suitable for use in the nutritional supplement powder disclosed herein is Instant Whey Protein Concentrate 80% (PIN104151) available from Milk Specialties (Eden Prairie, Minn.). An exemplary milk protein concentrate suitable for use in the nutritional supplement powder described herein is MPC 4861 available from Fonterra Co-operative Group Limited (Auckland, New Zealand).

As discussed above, the nutritional supplement powder includes from 20% by weight to 55% by weight protein. The amount of protein in the nutritional supplement powder may also be characterized in other ways. For example, in certain embodiments, the amount of protein in the nutritional supplement powder ranges from 5 grams to 20 grams per 100 kcal of the nutritional supplement powder, including from 8 grams to 16 grams per 100 kcal of the nutritional supplement powder, and also including 10 grams to 14 grams per 100 kcal of the nutritional supplement powder. In certain embodiments, the amount of protein is such that the nutritional supplement powder provides, per serving, from 1.7 grams to 4.8 grams of protein, including 2.5 grams to 3.5 grams of protein. Accordingly, the nutritional supplement powder provides a good source of protein for supplementing food that is low in or lacks protein.

In addition to protein, the nutritional supplement powder also includes fructooligosaccharide powder. Embodiments of the nutritional supplement powder described herein comprise from 20% by weight to 50% by weight fructooligosaccharide powder. In certain embodiments, the nutritional supplement powder comprises from 20% by weight to 45% by weight fructooligosaccharide powder, including from 25% by weight to 45% by weight fructooligosaccharide powder, from 30% by weight to 40% by weight protein, and also including from 35% by weight to 50% by weight fructooligosaccharide powder. The fructooligosaccharide powder provides a source of dietary fiber, which is often absent from the diets of infants and toddlers. In general, the fructooligosaccharide powder is greater than 95% by weight fructooligosaccharides, including greater than 98% by weight fructooligosaccharides, greater than 99% by weight fructooligosaccharides, and also including 100% by weight fructooligosaccharides. In certain embodiments, the nutritional supplement powder includes fructooligosaccharide powder in an amount so as to provide, per serving, from 1.5 grams to 4 grams of dietary fiber, including from 2 grams to 3 grams of dietary fiber.

Fructooligosaccharide powder is very hygroscopic. Due to its hygroscopic nature, the fructooligosaccharide powder absorbs moisture, which in turn causes the fructooligosaccharide powder to cake or clump. Typically when fructooligosaccharide powder is incorporated into a nutritional powder it is added in such low amounts (i.e., less than 15% by weight) that the hygroscopic nature of the fructooligosaccharide powder does not create caking or clumping issues. However, when fructooligosaccharide powder is used at higher levels (i.e., from 20% by weight to 50% by weight), as in the exemplary nutritional supplement powder disclosed herein, powder caking or clumping becomes a problem.

In addressing the powder caking issue imparted by the high level of fructooligosaccharide powder used in the exemplary nutritional supplement powder, it was surprisingly discovered that an anti-caking mixture comprising calcium silicate and tricalcium phosphate effectively prevented caking of the nutritional supplement powder. On the other hand, using calcium silicate or tricalcium phosphate alone did not prevent the powder from caking.

Accordingly, the exemplary embodiments of the nutritional supplement powder disclosed herein also include an anti-caking mixture comprising calcium silicate and tricalcium phosphate to prevent the nutritional supplement powder from caking. It was also discovered that a particular weight ratio of the fructooligosaccharide powder to the anti-caking mixture should be used to effectively prevent caking of the nutritional supplement powder. In the exemplary embodiments of the nutritional supplement powder disclosed herein, a weight ratio of the fructooligosaccharide powder to the anti-caking mixture is from 6:1 to 10:1, including from 7:1 to 10:1, from 7.5:1 to 9.5:1, from 8:1 to 9:1, and also including from 8.4:1 to 9:1.

The calcium silicate used in the anti-caking mixture of the nutritional supplement powder may be in the form of $CaSiO_3$ (monocalcium silicate), $Ca_2SiO_4$ (dicalcium silicate), $Ca_3SiO_5$ (tricalcium silicate), and combinations thereof. Calcium silicate is a very fine, white or off-white powder that has the ability to absorb significant amounts of water (1 to 2.5 times its weight) and yet remain a free flowing powder. Without wishing to be limited to any particular theory, it is believed that calcium silicate powder particles interact with or otherwise coat a portion of the surface area of the fructooligosaccharide powder particles and absorb moisture that would otherwise be absorbed by the fructooligosaccharide powder particles.

The tricalcium phosphate used in the anti-caking mixture of the nutritional supplement powder is a white powder with no taste that is insoluble in water. The tricalcium phosphate comprises very finely divided particles and functions as a flow agent by coating particles of other materials that tend to cake or clump, which reduces the tendency of the other materials to cake or clump and thereby improves the flow characteristics of the coated material. In addition, the tricalcium phosphate has a chalky texture, which makes it useful as a free flow agent, and can absorb only up to about 10% of its weight in water. Without wishing to be limited to any particular theory, it is believed that tricalcium phosphate powder particles interact with or otherwise coat a portion of the surface area of the fructooligosaccharide powder particles to improve the flowability of the fructooligosaccharide powder particles and may absorb some of the moisture that would otherwise be absorbed by the fructooligosaccharide powder particles.

In certain embodiments, the anti-caking mixture of the nutritional supplement powder comprises from 65% by weight to 80% by weight tricalcium phosphate and from 20% by weight to 35% by weight calcium silicate. In certain embodiments, the anti-caking mixture of the nutritional supplement powder comprises from 70% by weight to 80% by weight tricalcium phosphate and from 20% by weight to 30% by weight calcium silicate, and also including from 70% by weight to 75% by weight tricalcium phosphate and from 25% by weight to 30% by weight calcium silicate.

In certain embodiments, the calcium silicate has an average particle size of 4 µm to 5 µm, including from 4.25 µm to 4.8 µm, from 4.4 µm to 4.6 µm, and also including from 4.5 µm to 4.55 µm. In certain embodiments, the tricalcium phosphate has an average particle size of 2.5 µm to 3.25 µm, including from 2.6 µm to 3 µm, from 2.65 µm to 2.85 µm, and also including from 2.7 µm to 2.8 µm. It has been found that the average particle size range for the calcium silicate and the tricalcium phosphate is an important factor to ensure that the relatively larger particles of the fructooligosaccharide powder are adequately coated to assist in preventing caking and clumping in the nutritional supplement powder. In certain embodiments, the calcium silicate has an average particle size of 4 µm to 5 µm, the tricalcium phosphate has an average particle size of 2.5 µm to 3.25 µm, and the fructooligosaccharide powder has an average particle size of 80 µm to 100 µm.

In certain embodiments, the nutritional supplement powder also includes docosahexaenoic acid, lutein, and vitamin E. Docosahexaenoic acid is an omega-3 polyunsaturated fatty acid that supports the growth and functional development of the brain as well as promotes vision development in infants and toddlers. Lutein is a carotenoid that functions as an antioxidant. When ingested, lutein concentrates within the retina of the eye. It is generally known that dietary lutein supports eye health and vision development in infants and toddlers. Vitamin E functions an antioxidant that stabilizes unsaturated lipids in cell membranes against autoxidation and scavenges free radicals produced from lipid peroxidation by the normal activity of oxidative enzymes. Accordingly, vitamin E supports developing cells in infants and toddlers.

In certain embodiments, the nutritional supplement powder includes from 0.1% by weight to 0.5% by weight docosahexaenoic acid. In certain embodiments, the nutritional supplement powder includes from 0.15% by weight to 0.45% by weight docosahexaenoic acid, including from 0.2% by weight to 0.4% by weight, from 0.25% by weight to 0.4% by weight, and also including from 0.3% by weight to 0.4% by weight docosahexaenoic acid. In certain embodiments, the nutritional supplement powder includes docosahexaenoic acid in an amount so as to provide, per serving, from 10 milligrams to 50 milligrams of docosahexaenoic acid, including from 20 milligrams to 45 milligrams, from 25 milligrams to 40 milligrams, and also including from 30 milligrams to 35 milligrams of docosahexaenoic acid.

It is known that docosahexaenoic acid is susceptible to oxidation, which can result in fishy, painty, or otherwise rancid off-flavors and aromas. To provide protection against this oxidation and the resulting off-flavors and aromas, the docosahexaenoic acid used in the nutritional supplement powder may be an encapsulated docosahexaenoic acid. In certain embodiments, the nutritional supplement powder comprises encapsulated docosahexaenoic acid with antioxidants. In certain embodiments, the nutritional supplement powder comprises, per serving, from 10 milligrams to 50 milligrams of docosahexaenoic acid that is provided by encapsulated docosahexaenoic acid in powder form.

In certain embodiments, the nutritional supplement powder includes from 0.0005% by weight to 0.015% by weight lutein. In certain embodiments, the nutritional supplement powder includes from 0.001% by weight to 0.01% by weight lutein, including from 0.0015% by weight to 0.009% by weight, from 0.002% by weight to 0.006% by weight, and also including from 0.0022% by weight to 0.0034% by weight lutein. In certain embodiments, the nutritional supplement powder includes lutein in an amount so as to provide, per serving, from 50 micrograms to 1,000 micrograms of lutein, including from 100 micrograms to 600 micrograms, from 150 micrograms to 500 micrograms, from 175 micrograms to 350 micrograms, and also including from 200 micrograms to 300 micrograms of lutein. The lutein used in the nutritional supplement powder may be provided by free lutein, lutein esters, lutein salts, or other lutein derivatives.

In certain embodiments, the nutritional supplement powder includes from 0.01% by weight to 0.06% by weight vitamin E. In certain embodiments, the nutritional supplement powder includes from 0.015% by weight to 0.05% by weight vitamin E, including from 0.02% by weight to 0.04% by weight, and also including from 0.025% by weight to 0.035% by weight vitamin E. In certain embodiments, the nutritional supplement powder includes vitamin E in an amount so as to provide, per serving, from 0.8 milligrams to 5.25 milligrams of vitamin E, including from 1 milligram to 5 milligrams, from 1.5 milligrams to 4.5 milligrams, from 1.75 milligrams to 4 milligrams, and also including from 2 milligrams to 3 milligrams of vitamin E.

In those embodiments of the nutritional supplement powder that include vitamin E, the vitamin E may be provided by a wide variety of sources or forms of vitamin E. In certain embodiments, the vitamin E is provided, in part or in whole, by RRR-alpha-tocopherol. RRR-alpha-tocopherol is the naturally occurring form of vitamin E and has the greatest biological activity amongst the various other forms and isomers of vitamin E (e.g., beta-tocopherol, gamma-tocopherol, delta-tocopherol, and their isomers). In certain embodiments, the vitamin E is provided, in part or in whole, by all-rac-alpha tocopheryl acetate, or synthetic vitamin E. In certain embodiments, the vitamin E of the nutritional supplement powder is provided by RRR-alpha-tocopherol, all-rac-alpha tocopheryl acetate, beta-tocopherol and isomers thereof, gamma-tocopherol and isomers thereof, delta-tocopherol and isomers thereof, alpha-tocotrienol, beta-tocotrienol, gamma-tocotrienol, delta-tocotrienol, and combinations thereof.

In certain embodiments, the nutritional supplement powder includes from 0.1% by weight to 0.5% by weight docosahexaenoic acid, from 0.0005% by weight to 0.015% by weight lutein, and from 0.01% by weight to 0.06% by weight vitamin E. In certain embodiments, the nutritional supplement powder includes from 10 milligrams to 50 milligrams of docosahexaenoic acid, from 50 micrograms to 1,000 micrograms of lutein, and from 0.8 milligrams to 5.25 milligrams of vitamin E. The vitamin E may be provided by any one or more of the previously discussed sources or forms of vitamin E.

In certain embodiments, the nutritional supplement powder includes vitamins and minerals, which may, in certain embodiments, be in addition to vitamin E. In certain embodiments, the nutritional supplement powder includes vitamins selected from the group consisting of vitamin A, vitamin D3, vitamin E (including RRR-alpha-tocopherol, all-rac-alpha-tocopheryl acetate, other isomers of alpha-tocopherol, beta-tocopherol, gamma-tocopherol, delta-tocopherol, and their isomers, tocotrienols, and combinations thereof) vitamin K1, vitamin B1 (thiamin), vitamin B3 (niacin), vitamin B5 (pantothenic acid), vitamin B6 (pyridoxine), vitamin B7 (biotin), vitamin B12 (cyanocobalamin), and combinations thereof. In certain embodiments, the nutritional supplement powder comprises minerals selected from the group consisting of magnesium, potassium, iodine, manganese, chromium, molybdenum, selenium, and combinations thereof. In certain embodiments, the nutritional supplement powder provides, per serving, of at least 10% of the daily value (daily value based on a child less than 4 years of age) for each of vitamin A (~375 IU), vitamin D (~40 IU), vitamin E (~3 IU), vitamin B1 (~0.15 mg), vitamin B3 (~2 mg NE), pantothenic acid (~1 mg), vitamin B6 (~0.2 mg), vitamin B12 (~0.9 mcg), biotin (~15 mcg), calcium (~100 mg), magnesium (~20 mg), iodine (~21 mcg) and phosphorus (~80 mg). In addition to being important nutrients, the aforementioned vitamins and minerals exhibit a neutral flavor and color when utilized in the nutritional supplement powder.

In certain embodiments, all of the ingredients of the nutritional supplement powder are non-genetically modified, and thus the nutritional supplement powder itself is non-genetically modified.

In certain embodiments, the nutritional supplement powder is essentially free of divalent ions of copper, iron, and zinc. These particular metal ions can impart a strong metallic flavor to the nutritional supplement powder, and thus, sources of these metal ions should be avoided so that the nutritional supplement powder has a more neutral or bland flavor. In addition, by not using sources of divalent ions of copper, iron, and zinc can minimize the oxidation of the docosahexaenoic acid, if present, in the nutritional supplement powder, as well as the off-flavors resulting from such oxidation.

In certain embodiments, the nutritional supplement powder is essentially free of vitamin C and sources thereof (e.g., ascorbic acid, salts of ascorbic acid). Vitamin C, or sources thereof, can impart a strong vitamin flavor to the nutritional supplement powder, and thus, vitamin C and sources thereof should be avoided so that the nutritional supplement powder has a more neutral or bland flavor. Moreover, vitamin C and sources thereof should be avoided to prevent increased acidity, which can impart a sour flavor.

The various combination of ingredients in the nutritional supplement powder cooperate together to achieve a substantially colorless and bland or neutral flavored powder. As used herein, the term "substantially colorless" refers to a Hunter "L" value of at least about 80. It should be understood that the Hunter "L" values described herein are measured while the nutritional supplement powder is in powdered form. In certain embodiments, the nutritional supplement powder has a Hunter "L" value of at least about 80, including from about 85 to about 100, from about 85 to about 95, including from about 90 to about 95, and also including from about 95 to about 100. The Hunter "L" value corresponds to the lightness (brightest white at 100) or darkness (darkest black at 0) of a sample. In certain embodiments, the nutritional supplement powder has a Hunter "L" value of 85 to 95. In certain embodiments, the nutritional supplement powder may have a Hunter "L" value of at least 85 and appear as a light cream color. As discussed above, the nutritional supplement powder is essentially free of divalent ions of copper, iron, and zinc, as well as vitamin C, to eliminate the off-flavors associated with these components.

To accommodate the addition of the nutritional supplement powder into a serving of food, and yet not substantially change the organoleptic properties of the food, the nutritional supplement powder is formulated to have a small serving size. In certain embodiments, a single serving size of the nutritional supplement powder is from 5 grams to 12 grams, including from 6 grams to 10 grams, and also including about 8.7 grams. The nutritional supplement powder can be provided in single serving packaging (e.g., stick pack, pouch) or multi-serving packaging, such as a bulk container provided with a measuring scoop.

In certain embodiments, the nutritional supplement powder has a caloric density ranging from about 2.5 kcal/gram to about 4 kcal/gram. In certain embodiments, a single serving size of about 5 grams to about 12 grams of the nutritional supplement powder provides less than 40 kcal of energy. In certain other embodiments, a single serving size of about 5 grams to about 15 grams of the nutritional supplement powder provides less than 35 kcal of energy. In yet other embodiments, a single serving size of about 8.7 grams of the nutritional supplement powder provides about 25 kcal of energy.

The nutritional supplement powder may contain other optional ingredients. However, any such optional ingredients should not adversely affect the desirable properties of the nutritional supplement powder, such as the substantially colorless and bland or neutral flavor characteristics of the powder.

As discussed above, the exemplary nutritional supplement powders disclosed herein include an anti-caking mixture comprising calcium silicate and tricalcium phosphate to prevent caking of the nutritional supplement powder caused by the hygroscopic nature of the fructooligosaccharide powder. To achieve a nutritional supplement powder that does not exhibit caking, a particular method of making the nutritional supplement powder was required.

In one exemplary embodiment, a method of making the nutritional supplement powder disclosed herein includes mixing together fructooligosaccharide powder and an anti-caking mixture to form a powder pre-blend. The anti-caking mixture includes calcium silicate and tricalcium phosphate. A weight ratio of the fructooligosaccharide powder to the anti-caking mixture is from 6:1 to 10:1. The method also includes adding protein, docosahexaenoic acid, lutein, vitamins, and minerals to the powder pre-blend and mixing together to form the nutritional supplement powder.

The exemplary method of making the nutritional supplement powder may be carried out by dry blending the various ingredients of the nutritional supplement powder in a conventional blender or mixer, such as a ribbon blender, a v-blender, a paddle blender, or a plow blender. The key step in the method of making a nutritional supplement powder as described herein that does not cake or clump is to first prepare a powder pre-blend comprising the fructooligosaccharide powder and the anti-caking mixture, which comprises calcium silicate and tricalcium phosphate. As mentioned above, the weight ratio of the fructooligosaccharide powder to the anti-caking mixture is from 6:1 to 10:1, and in certain embodiments, the anti-caking mixture comprises from 65% by weight to 80% by weight tricalcium phosphate and from 20% by weight to 35% by weight calcium silicate.

In certain embodiments of the method, the fructooligosaccharide powder and the anti-caking mixture are mixed together for 2 minutes to 10 minutes. In certain embodiments of the method, the fructooligosaccharide powder and the anti-caking mixture are mixed together for 2 minutes to 8 minutes, including for 2 minutes to 6 minutes, for 3 minutes to 5 minutes, and also including about 4 minutes. Mixing the fructooligosaccharide powder with the anti-caking mixture for 2 minutes to 10 minutes ensures that the components of the anti-caking mixture adequately coat the surface of the fructooligosaccharide powder particles. It should be understood that the mixing times described herein refer to the total time that the ingredients are mixed together. Such mixing times do not have to be continuous. For example, the ingredients can be mixed together for 30 seconds, held for 10 minutes, and then mixed again for 1 minute and 30 seconds such that the total mixing time is 2 minutes.

In addition to the mixing time, using a sufficient amount of the anti-caking mixture to adequately coat the surface of the fructooligosaccharide powder particles is an important factor in producing the exemplary nutritional supplement powder without caking issues. Moreover, the average article size of the calcium silicate and the tricalcium phosphate as well as the average particle size of the fructooligosaccharide powder are also factors that help prevent the nutritional supplement powder from caking during the manufacturing process.

As previously mentioned, the weight ratio of fructooligosaccharide powder to the anti-caking mixture used to form the powder pre-blend in the method is from 6:1 to 10:1, including from 7:1 to 10:1, from 7.5:1 to 9.5:1, from 8:1 to 9:1, and also including from 8.4:1 to 9:1. It was found that when the fructooligosaccharide powder was mixed with an anti-caking mixture comprising from 65% by weight to 80% by weight tricalcium phosphate and from 20% by weight to 35% by weight calcium silicate, the resulting nutritional supplement powder did not cake or clump. Furthermore, it was found that using calcium silicate having an average particle size of 4 µm to 5 µm, tricalcium phosphate having an average particle size of 2.5 µm to 3.25 µm, and fructooligosaccharide powder having an average particle size of 80 µm to 100 µm resulted in a nutritional supplement powder that did not cake or clump.

After the powder pre-blend comprising the fructooligosaccharide powder and the anti-caking mixture is formed, the protein, docosahexaenoic acid, lutein, vitamins, and minerals are added to the powder pre-blend and mixed together to form the nutritional supplement powder. The protein, docosahexaenoic acid, lutein, vitamins, and minerals can be added to the powder pre-blend in any order, either individually or multiple (or all) ingredients simultaneously.

In certain embodiments of the method, the protein, docosahexaenoic acid, lutein, vitamins, minerals, and the powder pre-blend are mixed together for 4 minutes to 20 minutes. In certain embodiments of the method, the protein, docosahexaenoic acid, lutein, vitamins, minerals, and the powder pre-blend are mixed together for 6 minutes to 18 minutes, including for 8 minutes to 16 minutes, for 10 minutes to 14 minutes, and also including about 12 minutes. Mixing together the various ingredients for 4 minutes to 20 minutes, particularly for 8 minutes to 16 minutes, more particularly for 10 minutes to 14 minutes, and even more particularly for about 12 minutes ensures that resulting nutritional supplement powder is well-blended and homogenous. As noted above, the mixing times refer to the total time that the ingredients are mixed together and such total mixing times do not have to be continuous.

Any of the previously discussed sources and amounts of protein, fructooligosaccharide powder, anti-caking mixture comprising calcium silicate and tricalcium phosphate, docosahexaenoic acid, lutein, vitamin E, other vitamins, and minerals may be used in the exemplary methods described herein. In certain embodiments of the method, the protein comprises whey protein concentrate. In certain embodiments of the method, the resulting nutritional supplement powder comprises from 20% by weight to 55% by weight protein, from 20% by weight to 50% by weight fructooligosaccharide powder, and the weight ratio of the fructooligosaccharide powder to the anti-caking mixture is from 8:1 to 9:1. In certain embodiments of the method, the resulting nutritional supplement powder includes vitamins selected from the group consisting of vitamin E, vitamin A, vitamin D3, vitamin K1, vitamin B1, vitamin B3, vitamin B5, vitamin B6, vitamin B7, vitamin B12, and combinations thereof. In certain embodiments of the method, the resulting nutritional supplement powder includes minerals selected from the group consisting of magnesium, potassium, iodine, manganese, and combinations thereof.

In certain embodiments of the method, the nutritional supplement powder is packaged into stick packs. Stick packs and associated methods for packaging powder in stick packs are known in the art. In general, a stick pack is a small, elongated pouch that typically contains one serving of a powder. The stick pack may be foil, paper, or other conventional packaging material. The nutritional supplement powder of the present disclosure may be packaged in stick packs that contain from 5 grams to 12 grams of powder, including from 6 grams to 10 grams, and also including about 8.7 grams of powder.

In certain embodiments, the nutritional supplement powder is packaged into stick packs such that the percent oxygen (% $O_2$) in the headspace of the stick packs is less than 2%. This may be achieved using a conventional packaging and sealing system that includes a nitrogen gas flush. Reducing the % $O_2$ in the headspace of the stick packs helps reduce degradation of oxygen sensitive components in the nutritional supplement powder, such as docosahexaenoic acid, that can impart off-flavors when oxidized.

The exemplary methods of making the nutritional supplement powder described herein provide several advantages. For example, the exemplary methods reduce manufacturing costs in terms of the decrease in the need to clean the blending or mixing equipment (due to the powder caking and sticking to the surfaces of the equipment) after each batch of powder is produced. Since the exemplary methods result in a nutritional supplement powder that does not cake or clump, issues associated with powder clumping, such as clogging the powder conveying lines and filters, are avoided. The exemplary methods also decrease issues associated with not meeting fill weight ranges during packaging, and issues associated with controlling powder flow into the packaging, both of which are typically caused by powder caking or clumping issues.

The exemplary nutritional supplement powders disclosed herein are intended to be used to supplement the nutritional value of food. For example, the nutritional supplement powder is added to and mixed with a food product to provide additional nutritional value to the food product. Because of its bland flavor and color, adding the nutritional supplement powder to food does not substantially change the organoleptic properties of the food. For example, adding and mixing the nutritional supplement powder into food does not substantially change the color or texture of the food. It should be understood that any of the previously described embodiments of the nutritional supplement powder are suitable for use in supplementing the nutritional value of food.

The nutritional supplement powder may be added to a wide variety of foods to supplement the foods with a good source of protein and fiber, and in certain embodiments, vitamins, minerals, lutein, and docosahexaenoic acid. The nutritional supplement powder may be added to foods that are rich in carbohydrates, such as simple sugars, that are often preferred by toddlers and picky eaters. Thus, the nutritional supplement powder may be used to fill the nutrient gaps in foods preferred by toddlers and picky eaters.

The nutritional supplement powder may be added to foods that contain various amounts of moisture. For example, in certain embodiments, the nutritional supplement powder is added to a food having a moisture content of about 1% to about 30% by weight of the food, including a moisture content of about 1% to about 20%, a moisture content of about 1% to about 10%, or a moisture content of about 1% to about 5% by weight of the food. One exemplary food having a moisture content of about 1% to about 30% by weight is peanut butter. Other exemplary foods having a moisture content of about 1% to about 30% by weight to which the nutritional supplement powder may be added include, but are not limited to, high fat spreads (e.g., cheese spread, butter, hazelnut spread, almond butter), jams, jellies, and so forth. In certain embodiments, the nutritional supplement powder may be incorporated into a mix (e.g., cake mix, brownie mix, cookie mix, instant noodle mix), which is then baked or otherwise cooked so that the resulting food has a moisture content of about 1% to about 30% by weight.

In certain embodiments, the nutritional supplement powder is added to a food having a moisture content of about 30% to about 90% by weight of the food, including a moisture content of about 40% to about 90%, a moisture content of about 50% to about 90%, a moisture content of about 60% to about 90%, a moisture content of about 70% to about 90%, or a moisture content of about 80% to about 90% by weight of the food. Exemplary foods having a moisture content of about 30% to about 90% by weight include, but are not limited to, macaroni-and-cheese, yogurt, batters, mashed potatoes, soups, grain based porridge, cooked rice dishes, puddings, pasta, and so forth.

In addition to foods having a variety of water content, the nutritional supplement powder is also suitable for use in foods of various pH levels. In certain embodiments, the food may have a pH of about 2 to about 4.6 before the nutritional supplement powder is added. For example, the nutritional supplement powder may be added to foods such as tomato soup, yogurt, applesauce, and so forth. In certain other embodiments, the food has a pH of about 4.6 to about 8 before the nutritional supplement powder is added. For instance, the nutritional supplement powder may be added to foods such as mashed potatoes, farina, peanut butter, fruit puree, vegetable puree, soups, stews, breakfast cereals (e.g., prepared oatmeal), and so forth.

After adding the nutritional supplement powder to the food, the food may be stirred or mixed for about 30 seconds to about 60 seconds to disperse the powder homogenously throughout the food. To minimize the impact of the nutritional supplement powder on the organoleptic properties (e.g., appearance, texture, taste, mouthfeel) of the food, the nutritional supplement powder is formulated to provide supplemental nutrients via a small serving size. For example, in certain embodiments, a single serving size of 5 grams to 12 grams of the nutritional supplement powder is added to a single serving of the food. In certain other embodiments, a single serving size of about 8.7 grams of the nutritional supplement powder is added to a single serving of the food. In addition to the small serving size, the solubility, dispersibility, and free flowing nature of the nutritional supplement powder allow the powder to be added to and mixed with a variety of foods without substantially changing the organoleptic properties of the foods.

The following examples illustrate certain exemplary embodiments of the nutritional supplement powders and methods described herein. The examples are given solely for the purpose of illustration and are not to be construed as limiting of the present disclosure, as many variations thereof are possible without departing from the spirit and scope of the present disclosure.

Example 1

Example 1 illustrates an exemplary embodiment of the nutritional supplement powder described herein. All ingredient amounts in Example 1 are listed as kilogram per 1000 kilogram batch of the nutritional supplement powder, unless otherwise indicated.

TABLE 1

| INGREDIENTS | Example 1 Amount |
|---|---|
| Whey Protein Concentrate | 504.0 kg |
| Fructooligosaccharide | 380.872 kg |
| Docosahexaenoic Acid | 39.1 kg |
| Tricalcium Phosphate | 31.7 kg |
| Magnesium Phosphate | 28.24 kg |
| Calcium Silicate | 12.0 kg |
| Vitamin A, D, E, K, Lutein premix | 2.236 kg |
| d-Alpha-Tocopheryl Acetate | 412.0 g |
| Vitamin A Palmitate | 50.2 g |
| Lutein | 49.0 g |
| Vitamin K1 | 1.5 g |
| Vitamin D3 | 183.0 mg |
| Dextrose, anhydrous | q.s. |
| Vitamin/Mineral premix | 1.852 kg |
| Niacinamide | 322.3 g |
| Calcium Pantothenate | 304.7 g |
| Thiamine Chloride Hydrochloride | 56.3 g |
| Pyridoxine Hydrochloride | 50.3 g |
| Manganese Sulfate | 29.5 g |
| Potassium Iodide | 3.6 g |
| Biotin | 3.2 g |
| Cyanocobalamin | 214 mg |
| Maltodextrin | q.s. |

Example 2

Example 2 illustrates the dietary values of the nutritional supplement powder described in Example 1. The amounts listed in Table 2 are based on a serving size of 8.7 grams of the nutritional supplement powder. The percent of the daily value (% DV) is based on the recommended daily values for a child of less than 4 years of age.

TABLE 2

| Dietary Values | Amount |
|---|---|
| Serving Size, g | 8.7 |
| Calories, kcal | 25 |
| Protein, g | 3 |
| Carbohydrates, g | 4 |
| Fiber, g | 3 |
| Sugars, g | <1 |
| Fat, g | <1 |
| Docosahexaenoic Acid, mg | 32 |
| Vitamins (% DV) | |
| Vitamin B1 | 20% |
| Vitamin B3 | 20% |
| Pantothenic Acid | 20% |

TABLE 2-continued

| Dietary Values | Amount |
| --- | --- |
| Vitamin B6 | 30% |
| Vitamin B12 | 25% |
| Biotin | 10% |
| Vitamin A | 15% |
| Vitamin D | 10% |
| Vitamin E | 30% |
| Minerals (% DV) | |
| Calcium | 10% |
| Phosphorus | 10% |
| Magnesium | 10% |
| Iodine | 30% |

Example 3

Example 3 illustrates the sensory performance of the nutritional supplement powder described in Example 1. In this example, the aroma, flavor, and aftertaste of the nutritional supplement powder were evaluated.

A panel of certified flavor profilers evaluated the samples for the intensity of various flavors and characteristics. For example, the profilers provided scores for the following aroma characteristics: balance, fullness, dairy sweet, whey, and dairy sour. The profilers also provided scores for the following flavor characteristics: balance, fullness, sweet, sour, whey (cheesy), fruity, waxy, powdery mouthfeel, drying, and tannin. In addition, the profilers evaluated the aftertaste and appearance of the powder. The samples of the nutritional supplement powder were provided in stick packs that had been stored for about 24 days from initial production. The samples tasted by the profilers were prepared by using a blender to reconstitute 4 stick packs, each of which contained about 8.7 grams of powder, in 16 fl. oz. of water. Foam was removed from the sample prior to serving to the panelists at room temperature (20° C. to 25° C.). After tasting, the panelist assessed the various characteristics of the sample and collaborated to reach a consensus using a scoring system set forth in Table 3 below. The consensus results for the sample are shown in Table 4.

TABLE 3

| Scale | Description |
| --- | --- |
| )( | Threshold |
| ½ | Very Slight |
| 1 | Slight |
| 1½ | Slight to Moderate |
| 2 | Moderate |
| 2½ | Moderate to Strong |
| 3 | Strong |

TABLE 4

| Characteristic | Score |
| --- | --- |
| Aroma | |
| Balance | 1 |
| Fullness | ½ |
| Dairy Sweet | 1 |
| Whey | 1 |
| Daily Sour | 1 |
| Flavor | |
| Balance | ½ |
| Fullness | ½ |

TABLE 4-continued

| Characteristic | Score |
| --- | --- |
| Sweet | ½ |
| Sour | ½ |
| Whey (cheesy) | 1 |
| Fruity | ½ |
| Waxy | ½ |
| Powdery Mouthfeel | 1½ |
| Drying | 1½ |
| Tannin | 1 |
| Dominant Aftertaste (at 1 minute): | |
| Drying | |
| Whey | |
| Tannin | |
| Appearance: | |
| Very fine off white powder with yellow and red specks. | |

The flavor profilers indicated that the powder product was fairly bland in both aroma and flavor. The flavor profilers also stated that whey was the dominant aromatic and that no docosahexaenoic acid related aromatics were detected.

Example 4

In this example, sensory testing was conducted to determine whether toddlers (ages 12 to 36 months) noticed any difference in a food product with the nutritional supplement powder of Example 1 mixed into the food product. The samples of the nutritional supplement powder were provided in stick packs that had been stored for about 2 months from initial production. The food products utilized in the present example were yogurt, oatmeal, and macaroni-and-cheese.

Testing Protocol for Example 4—

A total of 62 toddlers (ages 12 to 36 months) (along with their mothers) served as the panelists for tasting the food products. During recruitment of the panelists, the mothers were asked to indicate whether their child eats yogurt, oatmeal, and macaroni- and cheese and to provide the brand, flavor, and preparation instructions for each food item indicated.

The food items indicated by the mothers were prepared according to the preparation instructions provided. One stick pack of the nutritional supplement powder (~8.7 grams) was mixed into ½ cup of the prepared food. Each child was served ¼ cup of the final prepared test sample. The samples were presented in bowls that the mother brought from home that the child would typically eat from or small plastic bowls. Water was provided in a cup with a lid and integral spout (e.g., a sippy cup) for rinsing.

The testing was conducted in 30 minute individual sessions. Each mother was given a brief introduction to the study and the food was served to the child. Each mother was provided with the following information on a computerized ballot:

We are mixing the following into your child's food for the test today. It is a single serve pouch with a tear away top, filled with nutrient powder inside that you pour into your toddler's food and mix-in. It provides added nutrition (including protein, prebiotics, and key vitamins and minerals) to any of your toddler's favorite foods. Please serve the food to your child and observe your child's reaction to the food. Take as much time as needed to answer the following questions.

Question: Based on your child's reaction to eating this [type of food], do you think your child noticed their [type of food] was different?

Response Options: Yes; No; or I don't know.

The data for each food item was tabulated. The "I don't know" responses were not included in the analysis. The data was analyzed using a one-sided binomial test at 95% confidence level. The results are provided in Table 5.

TABLE 5

| Food Item | Number of Mothers Indicating "Yes" - child noticed the food was different | Number of Mothers Indicating "No" - child did not notice that the food was different | Minimum Number of Participants Needed for Significance |
|---|---|---|---|
| Macaroni-and-Cheese | 1 | 20 | 15 |
| Oatmeal | 4 | 13 | 13 |
| Yogurt | 4 | 20 | 17 |

As seen in Table 5, a significant number of mothers indicated that their child could not tell that the food items containing the added nutritional supplement powder was different.

Example 5

Example 5 illustrates an exemplary embodiment of the nutritional supplement powder described herein. All ingredient amounts for Example 5 are listed as kilogram per 1000 kilogram batch of the nutritional supplement powder, unless otherwise indicated.

TABLE 6

| INGREDIENTS | Example 5 Amount |
|---|---|
| Agglomerated Whey Protein Concentrate | 617.27 kg |
| Fructooligosaccharide | 305.9 kg |
| Magnesium Phosphate | 27.0 kg |
| Tricalcium Phosphate | 24.3 kg |
| Calcium Silicate | 12.0 kg |
| Docosahexaenoic Acid Powder | 9.9 kg |
| Vitamin A, D, E, K, Lutein premix | 2.18 kg |
| d-Alpha-Tocopheryl Acetate (all-rac) | 402 g |
| Vitamin A Palmitate | 28.23 g |
| Phylloquinone | 1.49 g |
| Vitamin D3 | 179 mg |
| Dextrose | q.s. |
| Vitamin/Mineral premix | 1.45 kg |
| Niacinamide | 252.3 g |
| Calcium d-Pantothenate | 238.5 g |
| Thiamine Hydrochloride | 44.1 g |

TABLE 6-continued

| INGREDIENTS | Example 5 Amount |
|---|---|
| Pyridoxine Hydrochloride | 39.4 g |
| Manganese Sulfate | 23.1 g |
| Potassium Iodide | 2.8 g |
| Biotin | 2.5 g |
| Chromium Chloride | 1.4 g |
| Sodium Molybdate | 970 mg |
| Sodium Selenate | 808 mg |
| Cyanocobalamin | 167 mg |
| Maltodextrin | q.s. |

Example 6

In this example, an experiment was conducted to evaluate the effectiveness of pre-blending the fructooligosaccharide powder to inhibit caking or clumping. Three powder blends containing fructooligosaccharide powder were prepared and exposed to air for 44 hours. The powder blends are listed below in Table 7.

TABLE 7

| Powder Component | Powder Blend 1 (% by weight) | Powder Blend 2 (% by weight) | Powder Blend 3 (% by weight) |
|---|---|---|---|
| Fructooligosaccharide Powder | 100% | 97% | 89.7% |
| Calcium Silicate | 0% | 3% | 2.8% |
| Tricalcium Phosphate | 0% | 0% | 7.5% |

After being exposed to air for 44 hours, observations were made with respect to each powder blend. Powder Blend 1, which contained only fructooligosaccharide powder, exhibited complete caking. Powder Blend 2, which contained 97% by weight fructooligosaccharide powder and 3% by weight calcium silicate, exhibited some caking. Powder Blend 3, which contained 89.7% by weight fructooligosaccharide powder, 2.8% by weight calcium silicate, 7.5% by weight tricalcium phosphate, exhibited no caking or clumping.

Example 7

In this example, an experiment was conducted to evaluate the effectiveness of pre-blending the fructooligosaccharide powder to inhibit caking or clumping. Six powder blends containing fructooligosaccharide powder were prepared and stored for 48 hours at low humidity (i.e., a relative humidity of less than 49%), and then stored for 24 hours at 70° F. and a relative humidity of 49%. The powder blends are listed below in Table 8.

TABLE 8

| Powder Component | Powder Blend 101 (wt %) | Powder Blend 102 (wt %) | Powder Blend 103 (wt %) | Powder Blend 104 (wt %) | Powder Blend 105 (wt %) | Powder Blend 106 (wt %) |
|---|---|---|---|---|---|---|
| Fructooligosaccharide Powder | 89.7% | 85.7% | 90% | 89.7% | 89.7% | 100% |
| Calcium Silicate | 2.8% | 2.8% | 2.83% | — | 10.3% | — |
| Tricalcium Phosphate | 7.5% | 11.5% | 7.17% | 10.3% | — | — |

After being stored for 72 hours as described above, observations were made with respect to each powder blend. Powder Blends 101, 102, and 103, which contained fructooligosaccharide powder and an anti-caking mixture comprising calcium silicate and tricalcium phosphate at a weight ratio of the fructooligosaccharide powder to the anti-caking mixture of 8.7:1, 6:1, and 9:1, respectively, exhibited no caking or clumping. Powder Blend 104, which contained fructooligosaccharide powder and tricalcium phosphate at a weight ratio of the fructooligosaccharide powder to the tricalcium phosphate of 8.7:1, exhibited some caking. Likewise, Powder Blend 105, which contained fructooligosaccharide powder and calcium silicate at a weight ratio of the fructooligosaccharide powder to the calcium silicate of 8.7:1, exhibited some caking. Powder Blend 106, which contained only fructooligosaccharide powder, exhibited complete caking.

Example 8

The following example illustrates the effectiveness of forming a powder pre-blend as disclosed herein in making a nutritional supplement powder to prevent caking or clumping of the nutritional supplement powder. Powder A was prepared according to the exemplary methods disclosed herein, whereas Powder B was prepared according to a different method as described below.

Powder A—

The various ingredients of Powder A are shown below in Table 9. All ingredient amounts for Powder A are listed as pounds per 1,318 pound batch of the powder.

TABLE 9

| INGREDIENTS | Powder A Amount |
| --- | --- |
| Agglomerated Whey Protein Concentrate | 664.27 lb |
| Fructooligosaccharide | 501.99 lb |
| Docosahexaenoic Acid Powder | 51.53 lb |
| Tricalcium Phosphate | 41.78 lb |
| Magnesium Phosphate | 37.22 lb |
| Calcium Silicate | 15.82 lb |
| Vitamin ADEK-Lutein premix | 2.95 lb |
| Vitamin/Mineral premix | 2.44 lb |

Powder A was prepared using a clean, dry 66-ft$^3$ perforated ribbon blender. The fructooligosaccharide powder, tricalcium phosphate, and calcium silicate were added to the blender and mixed for 4 minutes to form a powder pre-blend. The magnesium phosphate was added to the blender through a 10 mesh screen and then the docosahexaenoic acid powder was added to the blender with the 10 mesh screen removed. Next, the vitamin ADEK-Lutein premix and the vitamin/mineral premix were added to the blender and were spread evenly using a paddle. Finally, the whey protein concentrate was added to the blender. After adding the whey protein concentrate, the ingredients were mixed in the blender for 6 minutes. The discharge dead spot was recycled and the ingredients were mixed in the blender for an additional 6 minutes (with intermittent stoppages to obtain samples) to form Powder A. The batch of Powder A was subsequently dumped into a tote.

Powder B—

The various ingredients of Powder B are shown below in Table 10. All ingredient amounts for Powder B are listed as pounds per 866 pound batch of the powder.

TABLE 10

| INGREDIENTS | Powder B Amount |
| --- | --- |
| Agglomerated Whey Protein Concentrate | 442.76 lb |
| Fructooligosaccharide | 359.8 lb |
| Magnesium Phosphate | 31.7 lb |
| Tricalcium Phosphate | 28.5 lb |
| Vitamin ADEK-Lutein premix | 1.66 lb |
| Vitamin/Mineral premix | 1.55 lb |

Powder B was prepared using a clean, dry 40-ft$^3$ perforated ribbon blender. The vitamin ADEK-Lutein premix was pre-blended by hand with about 10 pounds of the fructooligosaccharide powder and the vitamin/mineral premix was pre-blended by hand with about 10 pounds of the fructooligosaccharide powder. The whey protein concentrate was added to the blender through a 10 mesh screen and the blender was jogged for about 5 seconds. The magnesium phosphate, the tricalcium phosphate, and the pre-blended vitamin mixes were added to the blender and were spread evenly. The remaining fructooligosaccharide powder was added to the blender through a 10 mesh screen. After adding the remaining fructooligosaccharide powder, the ingredients were mixed in the blender for 6 minutes. The discharge dead spot was recycled and the ingredients were mixed in the blender for an additional 6 minutes (with intermittent stoppages to obtain samples) to form Powder B. The batch of Powder B was subsequently dumped into a tote.

Observations on Powder Caking/Clumping—

Figure 1:
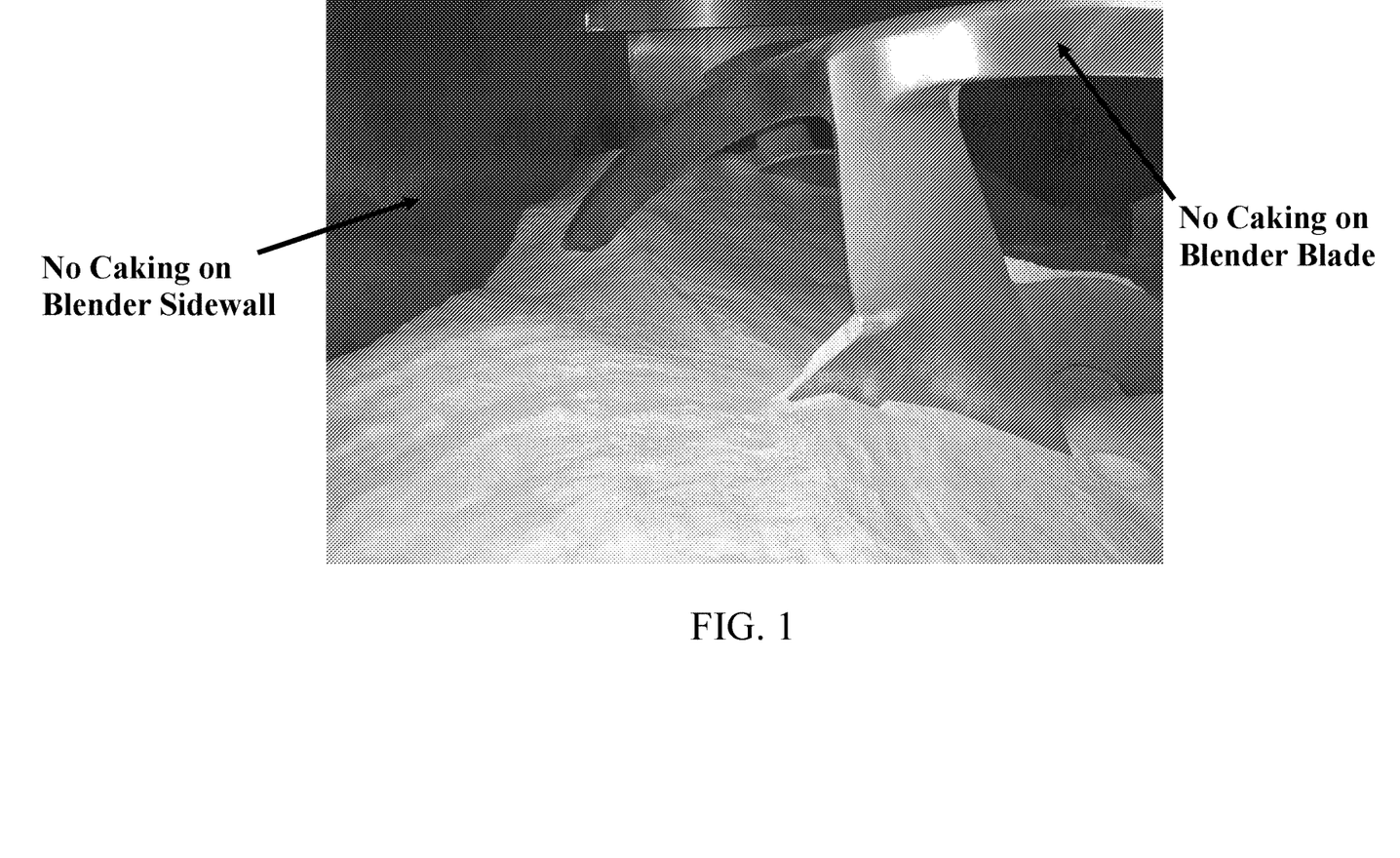
FIG. 1 is an image of the inside of a blender used to make an embodiment of the nutritional supplement powder (Powder A) disclosed herein according to Example 7, which shows no powder caking on the blender blade or blender sidewall.

Throughout the process of making Powder A, no caking or clumping of the powder was observed. As seen in FIG. 1, there was no powder caked on the blender blade or the sidewalls of the blender after the blending of Powder A was completed. The lack of powder caked on the blender blade and sidewalls of the blender demonstrates that the process of making Powder A results in a free flowing powder.

Figure 2A:
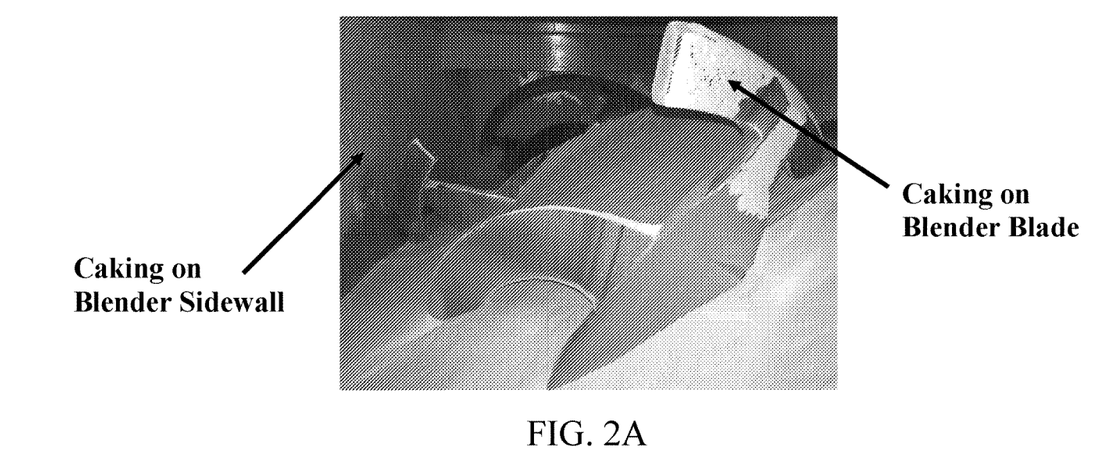
FIG. 2A is an image of the inside of a blender used to make a powder (Powder B) according to Example 7, which shows powder caking on the blender blade and the blender sidewall.
Figure 2B:
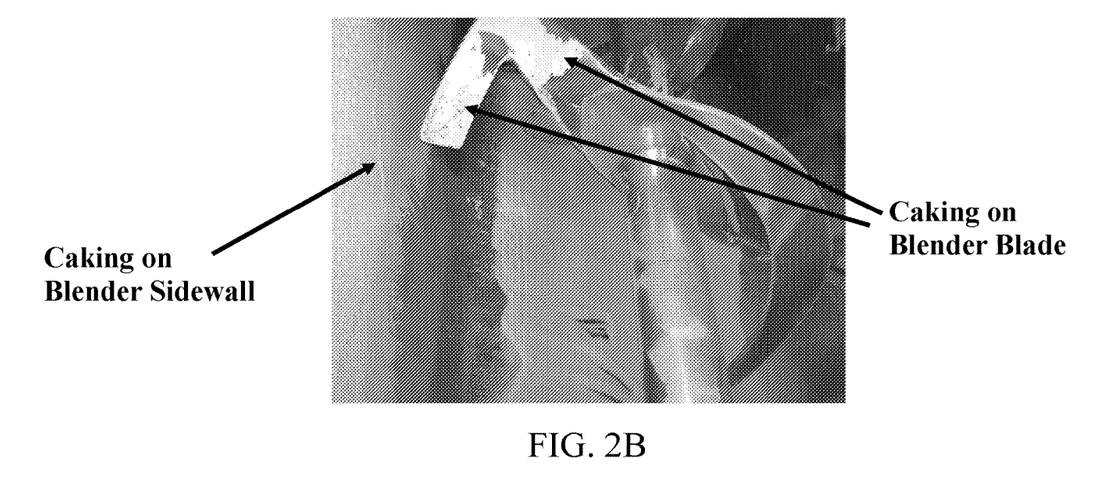
FIG. 2B is an image of the inside of a blender used to make a powder (Powder B) according to Example 7, which shows powder caking on the blender blade and the blender sidewall.

During the process of making Powder B, it was observed that the powder exhibited caking. As seen in FIGS. 2A and 2B, there was powder caked onto the blender blade and the sidewalls of the blender after the blending of Powder B was completed. The powder caked to the blender blade and the sidewalls demonstrates that the process of making Powder B results in a powder that has a tendency to cake or clump. In addition, due to the buildup of powder on the blender blade and the sidewalls of the blender, the blender would require much more frequent cleaning, which decreases powder production and increases manufacturing costs.

Both Powder A and Powder B were packaged into stick packs at 8.7 grams and 8.1 grams, respectively. During the packaging of Powder A, the powder flowed well from the tote to the stick pack filling system, and no caking or clumping issues were encountered. During the packaging of Powder B, the powder exhibited some caking, which impeded the flow of the powder through the 10 mesh screen from the tote to the line conveying the powder to the stick pack filling system.

Example 9

Example 9 illustrates the Hunter "L," "a," and "b" color values of the nutritional supplement powder described in Example 1.

TABLE 11

| Hunter Color Component | Value |
| --- | --- |
| Hunter "L" | 89.02 |
| Hunter "a" | −0.61 |
| Hunter "b" | 13.6 |

The nutritional supplement powder was very light in color, as noted by the Hunter "L" value of 89.02 (a Hunter "L" value of 0 corresponds to the darkest black, while a Hunter "L" value of 100 corresponds to the brightest white). The nutritional supplement powder also had a light cream/neutral tint based on the Hunter "b" value of 13.6 (positive Hunter "b" values measure yellowness).

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the present disclosure, in its broader aspects, is not limited to the specific details, the representative compositions and processes, and illustrative examples shown and described. Accordingly, departures may be made from such details without departing from the spirit or scope of the present disclosure.

What is claimed is:

1. A nutritional supplement powder comprising:
   from 20% by weight to 55% by weight protein;
   from 35% by weight to 50% by weight fructooligosaccharide powder, based on the total weight of the nutritional supplement powder;
   an anti-caking mixture comprising from 20% by weight to 35% by weight calcium silicate and from 65% by weight to 80% by weight tricalcium phosphate, based on the total weight of the anti-caking mixture; and
   wherein a weight ratio of the fructooligosaccharide powder to the anti-caking mixture is from 6:1 to 10:1.

2. The nutritional supplement powder of claim 1, wherein the protein comprises whey protein.

3. The nutritional supplement powder of claim 1, further comprising docosahexaenoic acid, lutein, and vitamin E.

4. The nutritional supplement powder of claim 1, further comprising from 0.1% by weight to 0.5% by weight docosahexaenoic acid.

5. The nutritional supplement powder of claim 1, further comprising from 0.004% by weight to 0.0055% by weight lutein.

6. The nutritional supplement powder of claim 1, further comprising from 0.01% by weight to 0.06% by weight vitamin E.

7. The nutritional supplement powder of claim 1, comprising from 30% by weight to 40% by weight protein, from 35% by weight to 45% by weight fructooligosaccharide powder, based on the total weight of the nutritional supplement powder, and wherein the weight ratio of the fructooligosaccharide powder to the anti-caking mixture is from 8:1 to 9:1.

8. The nutritional supplement powder of claim 1, wherein the calcium silicate has an average particle size of 4 μm to 5 the tricalcium phosphate has an average particle size of 2.5 μm to 3.25 and the fructooligosaccharide powder has an average particle size of 80 μm to 100 μm.

9. The nutritional supplement powder of claim 1, wherein the nutritional supplement powder is essentially free of divalent ions of copper, iron, and zinc.

10. The nutritional supplement powder of claim 1, further comprising vitamins selected from the group consisting of vitamin A, vitamin D3, vitamin K1, vitamin B1, vitamin B3, vitamin B5, vitamin B6, vitamin B7, vitamin B12, and combinations thereof.

11. The nutritional supplement powder of claim 1, further comprising minerals selected from the group consisting of magnesium, potassium, iodine, manganese, chromium, molybdenum, selenium, and combinations thereof.

12. A method of making a nutritional supplement powder, the method comprising:
    mixing together fructooligosaccharide powder and an anti-caking mixture to form a powder pre-blend, wherein the anti-caking mixture comprises calcium silicate and tricalcium phosphate and a weight ratio of the fructooligosaccharide powder to the anti-caking mixture is from 6:1 to 10:1;
    adding protein, docosahexaenoic acid, lutein, vitamins, and minerals to the powder pre-blend and mixing together to form the nutritional supplement powder.

13. The method of claim 12, wherein the fructooligosaccharide powder and the anti-caking mixture are mixed together for 2 minutes to 10 minutes.

14. The method of claim 12, wherein the protein, docosahexaenoic acid, lutein, vitamins, minerals, and the powder pre-blend are mixed together for 4 minutes to 20 minutes.

15. The method of claim 12, further comprising packaging the nutritional supplement powder into stick packs.

16. The method of claim 15, wherein a headspace of the stick packs have an oxygen level of less than 2%.

17. The method of claim 12, wherein the protein comprises whey protein.

18. The method of claim 12, wherein the nutritional supplement powder comprises from 20% by weight to 55% by weight protein, from 20% by weight to 50% by weight fructooligosaccharide powder.

19. The method of claim 12, wherein the anti-caking mixture comprises from 65% by weight to 80% by weight tricalcium phosphate and from 20% by weight to 35% by weight calcium silicate.

* * * * *